Figure 1:
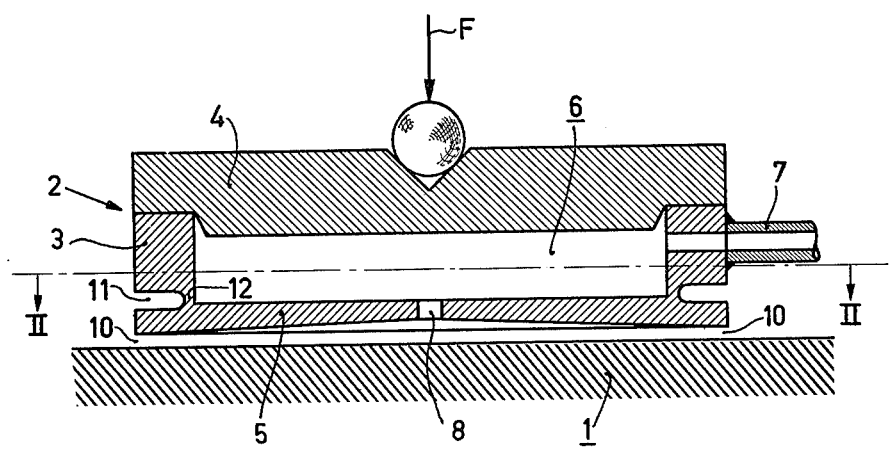

United States Patent [19]

Franken et al.

[11] 4,449,834
[45] May 22, 1984

[54] AEROSTATIC AXIAL THRUST BEARING

[75] Inventors: Adrianus Franken; Johannes L. M. Hagen, both of Eindhoven, Netherlands

[73] Assignee: U.S. Philips Corporation, New York, N.Y.

[21] Appl. No.: 374,441

[22] Filed: May 3, 1982

[30] Foreign Application Priority Data

May 11, 1981 [NL] Netherlands .......................... 8102286

[51] Int. Cl.³ .............................................. F16C 32/06
[52] U.S. Cl. ........................................ 384/99; 384/104
[58] Field of Search ................ 308/5 R; 384/99, 100, 384/103, 104, 105, 106, 107, 111, 114, 118, 119, 121, 124, 322, 368, 303

[56] References Cited

U.S. PATENT DOCUMENTS 3,765,732 10/1973 Watt ..................................... 384/104
3,806,209 4/1974 Laing et al. .......................... 384/104
3,909,084 9/1975 Snidar et al. ......................... 384/203
3,960,414 6/1976 Brzeski et al. ....................... 384/119
4,045,098 8/1977 Blondeel .............................. 384/104

Primary Examiner—Stuart S. Levy
Assistant Examiner—David Werner
Attorney, Agent, or Firm—Robert S. Smith

[57] ABSTRACT

An aerostatic axial thrust bearing comprising a movable part and a stationary part, one of said parts being constructed as a cup-shaped member having an upright wall, a closure member and a bottom which faces the other bearing part and which is formed by a diaphragm having a central opening. The side of the diaphragm facing the other bearing part is shaped so that the bearing gap between the two parts becomes narrower from the central opening in the diaphragm towards its outer edge, and the cup-shaped member having an inlet for the admission of a gaseous pressure medium to the space inside the cup-shaped member. The diaphragm is connected to the upright wall of the cup-shaped member at a location which is situated between the central opening and the outer edge of the diaphragm.

1 Claim, 2 Drawing Figures

U.S. Patent

May 22, 1984

4,449,834

AEROSTATIC AXIAL THRUST BEARING

The invention relates to an aerostatic axial thrust bearing comprising a movable part and a stationary bearing part, one of said parts being constructed as a cup-shaped member having an upright wall, a closure member and a bottom which faces the other bearing part to form therewith a bearing gap and which is formed by a diaphragm having a central opening, the side of said diaphragm which faces the other bearing part being shaped so that the bearing gap between the two parts becomes narrower from the central opening in the diaphragm towards the outer edge thereof, and the cup-shaped member having an inlet for the admission of a gaseous pressure medium to the space inside the cup-shaped member.

A bearing of the kind which forms the subject of the present invention is described in DE-OS No. 25 44 872. This German Offenlegungsschrift describes a bearing, one bearing part of which is constructed as a cup-shaped member whose bottom which faces the other bearing part is formed by a diaphragm with a central opening and whose outer edge is connected to the upright wall of the cup.

The diaphragm is shaped so that the bearing gap decreases conically from the central opening towards the outflow edge. Thus, a bearing is obtained in which the shape of the bearing gap adapts itself, by variation of the apical angle of the gap, to different load conditions, without the position of the bearing element itself being changed to any significant degree. In other words, a bearing having a high rigidity is obtained, "rigidity" being understood herein to mean the variation of the distance between the connection point of the diaphragm and the fixed bearing portion, divided by the load variation.

A high bearing rigidity is extremely important for all high-precision machines.

The invention has for its object to improve the known bearing so that the rigidity becomes substantially infinitely high, or that the bearing force and the rigidity are independent of fluctuations in the supply pressure.

In order to achieve this object the bearing in accordance with the invention is characterized in that the diaphragm is connected to the upright wall of the cup-shaped member at a location between the central opening and the outer edge of the diaphragm. In a preferred embodiment, the upright wall and the diaphragm form an integral unit and the upright wall is formed with a deep circumferential grroove so that only a thin portion of material remains between the diaphragm and the upright wall to connect the diaphragm to the wall.

It has been found that when the diaphragm is connected to the upright wall at a location situated between the outer edge and the central opening of the diaphragm instead of actually at its outer edge, a substantially higher, almost infinitely high rigidity is obtained. The thin portion of material between the diaphragm and the upright wall of the cup-shaped member then acts as a hinge at which the diaphragm pivots when the load or the supply pressure changes. Consequently, the conical shape of the bearing gap changes and hence also the bearing force, without the distance between the hinge and the fixed bearing portion being changed.

At this time it is not known how exactly the diaphragm is deformed, but it is known that in this manner a very stable bearing having a high bearing force and an infinitely high rigidity is obtained. A bearing of this kind is important for use in a variety of precision machines, measuring machines etc.

An embodiment of the invention will be described in detail hereinafter with reference to the drawings, which are sectional views of an aerostatic bearing taken in two mutaully perpendicular planes.

Figure 2:
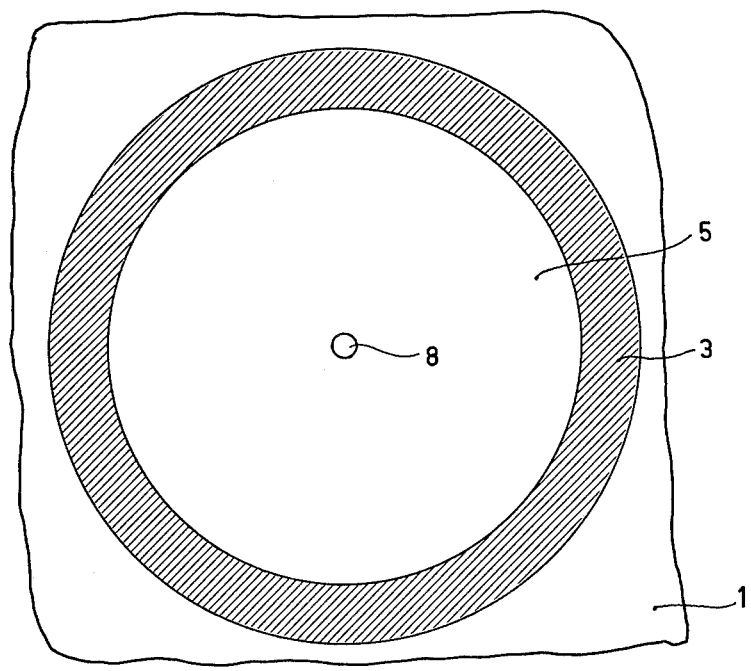

FIG. 1 is a sectional illustration of an embodiment in accordance with the invention, and FIG. 2 is a section on line II—II of FIG. 1.

The drawings show a bearing which consists of a fixed first part 1 and a rotatable second part 2. The part 2 is cup-shaped and comprises an upright wall 3, a closure member 4 and a bottom which is formed by a flexible diaphragm 5. Inside the cup-shaped part 2 there is a space 6 which can be connected to a pressure-medium source via an inlet 7.

The diaphragm 5 has a central opening 8. A load F can be exerted on the closure member 4 when the bearing is in use.

Before the central opening 8 is made in the diaphragm, a pressure is built up in the space 6 via the inlet 7 so as to deflect the diaphragm outwardly. While thus deflected the diaphragm is ground flat on its outer side. As a result, the diaphragm 5 becomes slightly thinner towards the center, so that the bearing gap 10 becomes narrower from the opening 8 towards the outflow edge 10.

A circumferential groove 11 is cut in the outer side of the upright wall 3, so that the diaphragm 5 is connected to the upright wall 3 only by a thin portion of material 12. Because the portion 12 is so thin, it acts in effect as a hinge.

The dimensions of a practical embodiment of the bearing were as follows:

Outer diameter of the diaphragm 5: 100 mm
Thickness of the diaphragm 5: 6 mm
Diameter of the space 6: 80 mm
Depth of the groove 11: 9 mm The pressure in the space 6 amounted to: 6 bar.

In spite of the use of a gaseous pressure medium, such a bearing exhibited a substantially infinitely high rigidity, which means that the position of the upper surface of the bearing is not subject to change in reaction to a large variety of loads. This is in contrast with known bearings in which some change of the position of the bearing occurs in reaction to load variations.

This effect is probably due to the fact that the diaphragm of the bearing in accordance with the invention hinges at a location, namely the location of the thin portion of material 12, which does not coincide with the outer edge of the diaphragm but is situated slightly inwardly of this edge.

The bearing in accordance with the invention with a pressure-dependent conical bearing gap can be comparatively simply manufactured, and due to the above properties it is very suitable for use in precision machines.

What is claimed is:

1. An aerostatic axial thrust bearing comprising a movable part and a stationary part, one of said parts being constructed as a cup-shaped member having an upright wall, a closure member and a bottom comprising a diaphragm which faces the other bearing part to define therewith a bearing gap, said upright wall and said diaphragm forming an integral unit, said diaphram having a central opening, the side of said diaphragm which faces the other bearing part being shaped so that the bearing gap between the two parts becomes narrower from the central opening in the diaphragm towards the outer edge thereof, and the cup-shaped member having an inlet for the admission of a gaseous pressure medium to the space inside the cup-shaped member, characterized in that the diaphragm is connected to the upright wall of the cup-shaped member only at a location (1) between the central opening and the outer edge of the diaphragm and (2) spaced from the outer edge of the diaphragm, the upright wall being provided with a deep circumferential groove so that only a portion of material remains that is substantially thinner than adjacent portions of said upright wall between the diaphragm and the upright wall to connect the diaphragm to the wall.

* * * * *

UNITED STATES PATENT AND TRADEMARK OFFICE
CERTIFICATE OF CORRECTION

PATENT NO. : 4,449,834
DATED : May 22, 1984
INVENTOR(S) : ADRIANUS FRANKEN; JOHANNES L.M. HAGEN

It is certified that error appears in the above—identified patent and that said Letters Patent is hereby corrected as shown below:

In the Title Page:

Under "Foreign Application Priority Data" the number should read --8102285--

Signed and Sealed this

Sixth Day of November 1984

[SEAL]

Attest:

GERALD J. MOSSINGHOFF

*Attesting Officer*  *Commissioner of Patents and Trademarks*